(12) United States Patent
Meng

(10) Patent No.: US 12,650,112 B2
(45) Date of Patent: Jun. 9, 2026

(54) PARALLEL FRAME TYPE GRAVITY ENERGY STORAGE AND TRANSPORTATION SYSTEM

(71) Applicant: NANTONG WEIYIKE TECHNICAL SERVICE CO., LTD., Hai'an City (CN)

(72) Inventor: Yuhai Meng, Hai'an City (CN)

(73) Assignee: NANTONG WEIYIKE TECHNICAL SERVICE CO., LTD., Hai'an City (CN)

( * ) Notice: Subject to any disclaimer, the term of this patent is extended or adjusted under 35 U.S.C. 154(b) by 66 days.

(21) Appl. No.: 18/872,714

(22) PCT Filed: May 26, 2023

(86) PCT No.: PCT/CN2023/096421
§ 371 (c)(1),
(2) Date: Dec. 6, 2024

(87) PCT Pub. No.: WO2023/236783
PCT Pub. Date: Dec. 14, 2023

(65) Prior Publication Data
US 2025/0305486 A1 Oct. 2, 2025

(30) Foreign Application Priority Data
Jun. 8, 2022 (CN) .......................... 202210646622.6

(51) Int. Cl.
*F03G 3/00* (2006.01)
(52) U.S. Cl.
CPC .................................... *F03G 3/094* (2021.08)

(58) Field of Classification Search
CPC ............. F03G 3/00; F03G 3/087; F03G 3/094
See application file for complete search history.

(56) References Cited

U.S. PATENT DOCUMENTS

| | | | |
|---|---|---|---|
| 7,087,092 B1 | 8/2006 | Landsberger | |
| 11,011,967 B2 * | 5/2021 | Zhang ...................... | H02K 3/12 |

(Continued)

FOREIGN PATENT DOCUMENTS

| | | |
|---|---|---|
| CN | 101117951 A | 2/2008 |
| CN | 115034610 A | 9/2022 |

OTHER PUBLICATIONS

International Search Report of Internation Application No. PCT/CN2023/096421, by the China National Intellectual Property Administration (ISA/CN), mailed Aug. 15, 2023 (5 pages) [Translation Provided].

*Primary Examiner* — Phillip A Johnson
(74) *Attorney, Agent, or Firm* — Nixon Peabody LLP

(57) ABSTRACT
A parallel frame type gravity energy storage and transportation system, including an energy storage layer area, and a storage layer area. The energy storage layer area includes multiple Y-direction energy storage layers, and multiple X-direction energy storage layers. The storage layer area includes multiple Y-direction storage layers distributed in a stacked manner in a Z direction, and multiple X-direction storage layers distributed in a stacked manner in the Z direction. Position switching of a gravity block between the Y-direction energy storage layer and the Y-direction storage layer is achieved through a transfer unit and a first lifting unit, and position switching of the gravity block between the X-direction energy storage layer and the X-direction storage layer is achieved through the transfer unit and a second lifting unit.

10 Claims, 9 Drawing Sheets

(56)                 References Cited

U.S. PATENT DOCUMENTS

| | | | |
|---|---|---|---|
| 2020/0028379 A1* | 1/2020 | Pedretti | .................. B66C 13/28 |
| 2021/0404445 A1 | 12/2021 | Pedretti | |
| 2021/0404448 A1* | 12/2021 | Pedretti | .................. B66C 13/28 |
| 2022/0209537 A1* | 6/2022 | Pedretti | .................... H02J 3/28 |
| 2023/0184229 A1* | 6/2023 | Pedretti | .................. F03G 3/094 |
| | | | 185/33 |

* cited by examiner

PARALLEL FRAME TYPE GRAVITY ENERGY STORAGE AND TRANSPORTATION SYSTEM

CROSS-REFERENCE TO RELATED APPLICATIONS

This patent application is a U.S. national stage application of International Patent Application No. PCT/CN2023/096421, filed May 26, 2023, which claims the benefit of and priority to Chinese Patent Application No. 202210646622.6, filed Jun. 8, 2022, each of which is hereby incorporated by reference herein in its entirety.

TECHNICAL FIELD

The present disclosure relates to the technical field of energy storage, and in particular to a parallel frame type gravity energy storage and transportation system.

BACKGROUND

In order to meet the requirements of peak carbon dioxide emissions, China has vigorously developed clean energy power generation projects, such as wind power generation, solar photovoltaic power generation, tidal power generation and other renewable pollution-free energy, thus reducing the carbon emissions from power generation by burning fossil fuels. However, clean energy power generation resources and power load are often mismatched, especially in the coastal area at night, the grid-side demand for wind power generation is reduced, and the power is difficult to consume, so energy storage is needed.

Energy storage refers to the storage of electricity, or the conversion of electricity into other forms of energy for storage, thus releasing and generating electric energy at the peak of electricity consumption to cooperate with the power grid for electricity peak shaving. At present, the commonly used energy storage methods include pumped hydro storage, compressed air storage, flywheel storage and other physical methods, which have restrictive requirements on geographical location and high motor moment of inertia and power consumption. However, the lithium-ion batteries and other electrochemical energy storage are short in cycle life, easy to cause environmental pollution, and has high safety risks. Supercapacitor energy storage and superconducting energy storage have low energy density and high cost.

As gravity energy storage uses physical methods to store potential energy by lifting weights, there is no pollution problem, and the motor is driven to generate electricity by releasing weights when there is a demand for electricity. However, the existing gravity energy storage methods use a single way of lifting weights, which is often inefficient, less in energy storage, restricted by geographical conditions, limited in capacity expansion, and high in life cycle cost.

The applicant decided to seek technical solutions to solve the above technical problems.

SUMMARY

In view of this, an objective of the present disclosure is to provide a parallel frame type gravity energy storage and transportation system. The energy storage can be achieved by simultaneously lifting the gravity block in both the X direction and the Y direction in a multi-channel parallel manner. Efficient capacity expansion of the stored energy in the X direction and the Y direction can be conveniently carried out while the operation efficiency is greatly improved. Electricity peak shaving can be carried out according to the demand of a power grid without being restricted by regional environment, thereby sufficiently meeting the development demand of green and clean energy.

The technical solution of the present disclosure is as follows:

A parallel frame type gravity energy storage and transportation system includes a gravity energy storage parallel frame fixedly installed on a foundation. The gravity energy storage parallel frame includes an energy storage layer area and a storage layer area which are vertically distributed in a Z direction.

The energy storage layer area includes multiple Y-direction energy storage layers distributed in a stacked manner in the Z direction, and multiple X-direction energy storage layers distributed in a stacked manner in the Z direction. The Y-direction energy storage layers and the X-direction energy storage layers are stacked and distributed in the Z direction in a mutual perpendicular manner. The storage layer area includes multiple Y-direction storage layers distributed in a stacked manner in the Z direction, and multiple X-direction storage layers distributed in a stacked manner in the Z direction.

The Y-direction energy storage layers and the Y-direction storage layers correspond to each other in the Z direction, and position switching of a gravity block between the Y-direction energy storage layer and the Y-direction storage layer is achieved through a transfer unit and a first lifting unit. The X-direction energy storage layers and the X-direction storage layers correspond to each other in the Z direction, and position switching of the gravity block between the X-direction energy storage layer and the X-direction storage layer is achieved through the transfer unit and a second lifting unit.

Preferably, each Y-direction energy storage layer is composed of multiple Y-direction energy storage layer channels which are arranged in turn in an X direction, and each X-direction energy storage layer is composed of multiple X-direction energy storage layer channels which are arranged in turn in a Y direction.

Each Y-direction storage layer is composed of multiple Y-direction storage layer channels which are arranged in turn in the X direction, and each X-direction storage layer is composed of multiple X-direction storage layer channels which are arranged in turn in the Y-direction.

The Y-direction storage layer channels and the Y-direction energy storage layer channels respectively correspond to each other in the Z direction, and the X-direction storage layer channels and the X-direction energy storage layer channels respectively correspond to each other in the Z direction.

Preferably, in the energy storage layer area, the Y-direction energy storage layer and the X-direction energy storage layer are distributed in a manner of stacking single layers in a staggered manner. In the storage layer area, the Y-direction storage layer and the X-direction storage layer are distributed in a manner of stacking single layers in a staggered manner.

Preferably, an intermediate layer area is arranged between the energy storage layer area and the storage layer area, and the intermediate layer area, as an expansion area of the energy storage layer area and the storage layer area in the Z direction, is used to increase gravity energy storage capacity.

Preferably, the first lifting unit includes multiple first lifting channels arranged in turn in the X direction, and the first lifting channels correspondingly communicate with the Y-direction energy storage layer channels and the Y-direction storage layer channels in the Z direction, respectively. The second lifting unit includes multiple second lifting channels arranged in turn in the Y direction, and the second lifting channels correspondingly communicate with the X-direction energy storage layer channels and the X-direction storage layer channels in the Z direction, respectively. The first lifting channel and the second lifting channel are correspondingly and internally provided with a first lifting motor module and a second lifting motor module, respectively. The first lifting motor module and the second lifting motor module are electrically connected to a control device, respectively. Selective energy storage or power generation is achieved by changing the gravity block by lifting and transferring. A guide rail, a slider and a stiffness damping unit are installed in each lifting channel, and the guide rail is connected to a corresponding slider thereof to achieve linear guidance in the Z direction.

Preferably, the first lifting motor module and the second lifting motor module each include a lifting generator, a hoist rope is installed on the lifting generator, and a tail end of the hoist rope is provided with a manipulator for selectively positioning and clamping the gravity block. The manipulator includes a long arm of the manipulator, which is selectively opened and installed on a support rod, and a telescopic rod is installed between the support rod and the hoist rope. The manipulator is connected to the slider through the stiffness damping unit, and is used to restrain the degree of rotational and translational freedom of the manipulator and the gravity block.

Preferably, the transfer unit and the corresponding lifting unit are connected to achieve the transferring of the gravity block. The transfer unit includes track beams correspondingly arranged in the Y-direction energy storage layer, the X-direction energy storage layer, the Y-direction storage layer and the X-direction storage layer, respectively, and a transfer cart for transferring the gravity block is installed on each track beam in a relative displacement manner.

Preferably, the transfer cart includes a transfer cart body for transferring the gravity block, a gear driven by a transfer cart motor is installed on the transfer cart body, and the gear is in corresponding fit with a rack installed on the track beam, thus achieving displacement guidance of the transfer cart body on the track beam.

Preferably, the transfer unit further includes a transit cart suspended on the track beam. The transit cart is provided with a vertical telescopic column, and a horizontal telescopic pin is installed at an end of the vertical telescopic column. The horizontal telescopic pin and the gravity block are in limited installation and in selective fit with each other.

Preferably, the transit cart includes a suspension cart body for transiting and transferring the gravity block, the gear driven by a suspension cart motor is installed on the suspension cart body, and the gear is in corresponding fit with a rack installed on the track beam, thus achieving the transferring displacement guidance of the transit cart on the track beam.

It should be noted that the gravity block involved in the present disclosure may employ a well-known structure, which is usually mainly made of sandstone and/or carbon steel, and is not particularly limited in the implementation of the present disclosure. Those skilled in the art can make specific choices according to actual needs.

According to the present disclosure, a gravity energy storage parallel frame structure composed of a Y-direction energy storage layer composed of multiple Y-direction energy storage layer channels arranged in turn in an X direction, an X-direction energy storage layer composed of multiple X-direction energy storage layer channels arranged in turn in a Y direction, a Y-direction storage layer composed of multiple Y-direction storage layer channels arranged in turn in the X direction and an X-direction storage layer composed of multiple X-direction storage layer channels arranged in turn in the Y direction is provided. The Y-direction energy storage layers and the X-direction energy storage layers are stacked and distributed in the Z direction (which may also be called a vertical direction) in a mutual perpendicular manner. The Y-direction storage layer channels and the Y-direction energy storage layer channels respectively correspond to each other in the Z direction, and the X-direction storage layer channels and the X-direction energy storage layer channels respectively correspond to each other in the Z direction. During actual operation, the energy storage can be achieved by simultaneously lifting the gravity block in both the X direction and the Y direction in a multi-channel parallel manner. Efficient capacity expansion of the stored energy in the X direction and the Y direction can be conveniently carried out while the operation efficiency is greatly improved. Electricity peak shaving can be carried out according to the demand of a power grid without being restricted by regional environment, thereby sufficiently meeting the development demand of green and clean energy.

DETAILED DESCRIPTION OF THE EMBODIMENTS

This embodiment provides a parallel frame type gravity energy storage and transportation system, including a gravity energy storage parallel frame fixedly installed on a foundation. The gravity energy storage parallel frame includes an energy storage layer area and a storage layer area vertically distributed in a Z direction. The energy storage layer area includes multiple Y-direction energy storage layers distributed in a stacked manner in the Z direction, and multiple X-direction energy storage layers distributed in a stacked manner in the Z direction. The Y-direction energy
storage layers and the X-direction energy storage layers are
stacked and distributed in the Z direction in a mutual
perpendicular manner. The storage layer area includes mul-
tiple Y-direction storage layers distributed in a stacked
manner in the Z direction, and multiple X-direction storage
layers distributed in a stacked manner in the Z direction. The
Y-direction energy storage layers and the Y-direction storage
layers correspond to each other in the Z direction, and
position switching of a gravity block between the Y-direc-
tion energy storage layer and the Y-direction storage layer is
achieved through a transfer unit and a first lifting unit. The
X-direction energy storage layers and the X-direction stor-
age layers correspond to each other in the Z direction, and
position switching of the gravity block between the X-di-
rection energy storage layer and the X-direction storage
layer is achieved through the transfer unit and a second
lifting unit.

The embodiments of the present disclosure are provided
for those skilled in the art to understand the technical
solutions of the present disclosure better, the following
clearly and completely describes the technical solutions in
the embodiments of the present disclosure with reference to
the accompanying drawings in the embodiments of the
present disclosure. Apparently, the described embodiments
are merely a part rather than all of the embodiments of the
present disclosure. All other embodiments obtained by those
of ordinary skill in the art based on the embodiments of the
present disclosure without creative efforts shall fall within
the protection scope of the present disclosure.

Figure 1:
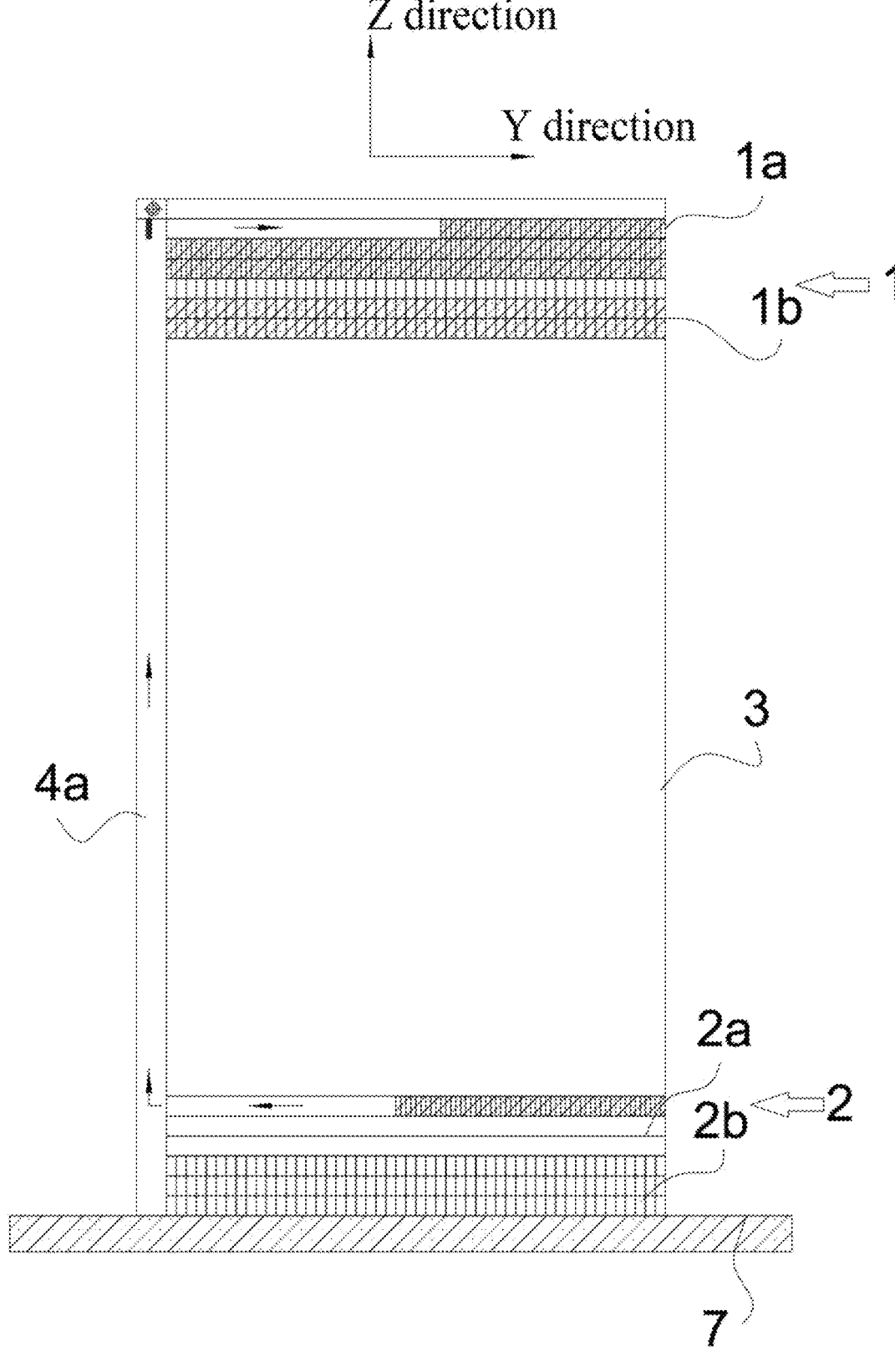
FIG. 1 is a sectional diagram of a parallel frame type gravity energy storage and transportation system according to a specific embodiment of the present disclosure in a Y-Z direction (an arrow in the figure represents a stored energy transportation direction of a gravity block)
Figure 2:
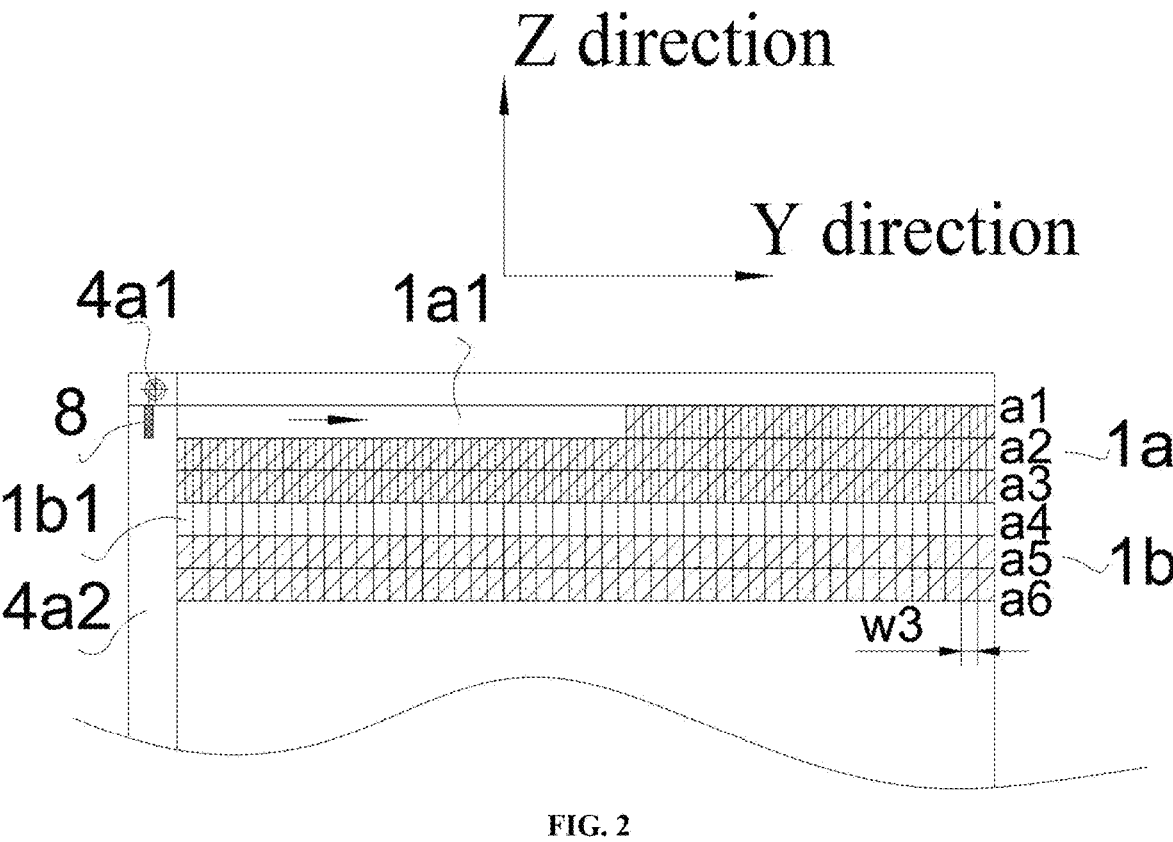
FIG. 2 is an enlarged view of a partial structure in FIG. 1.
Figure 3:
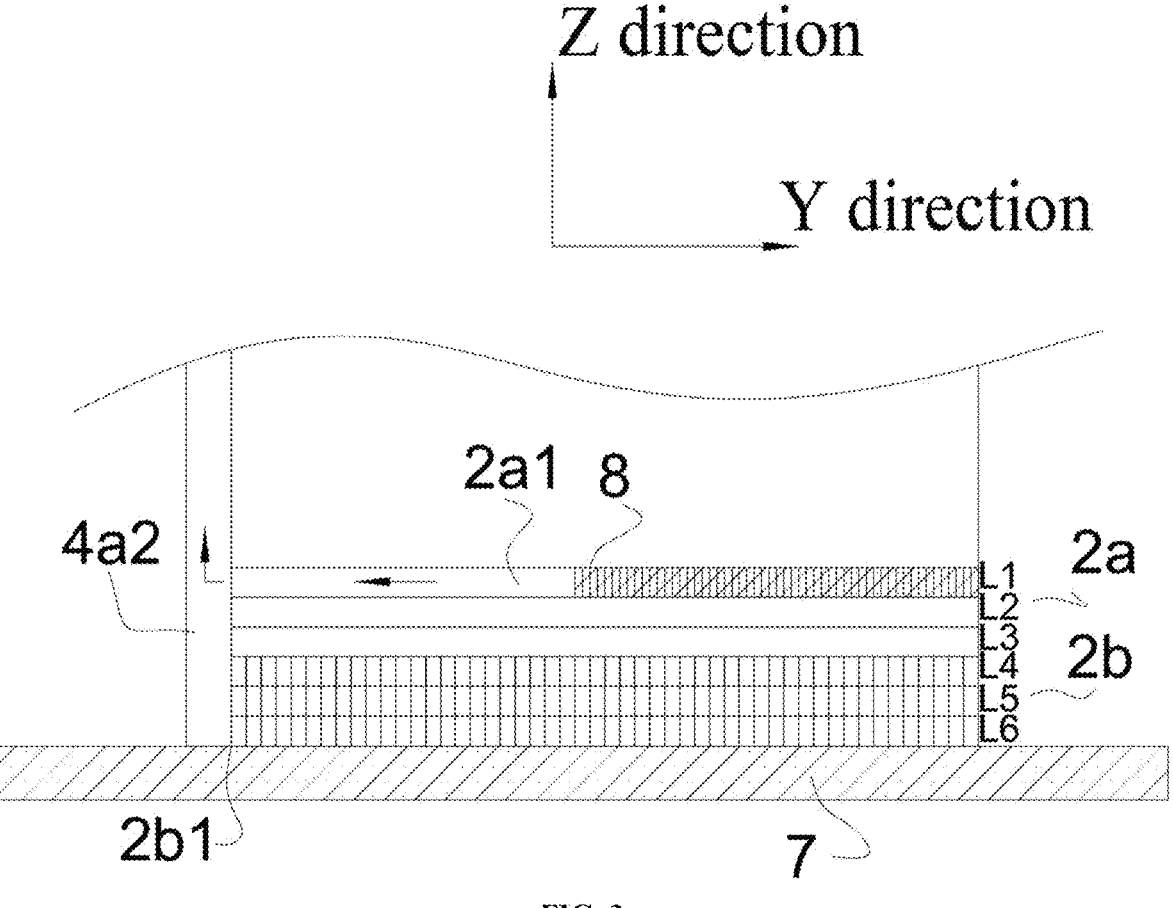
FIG. 3 is an enlarged view of another partial structure in FIG. 1.
Figure 4:
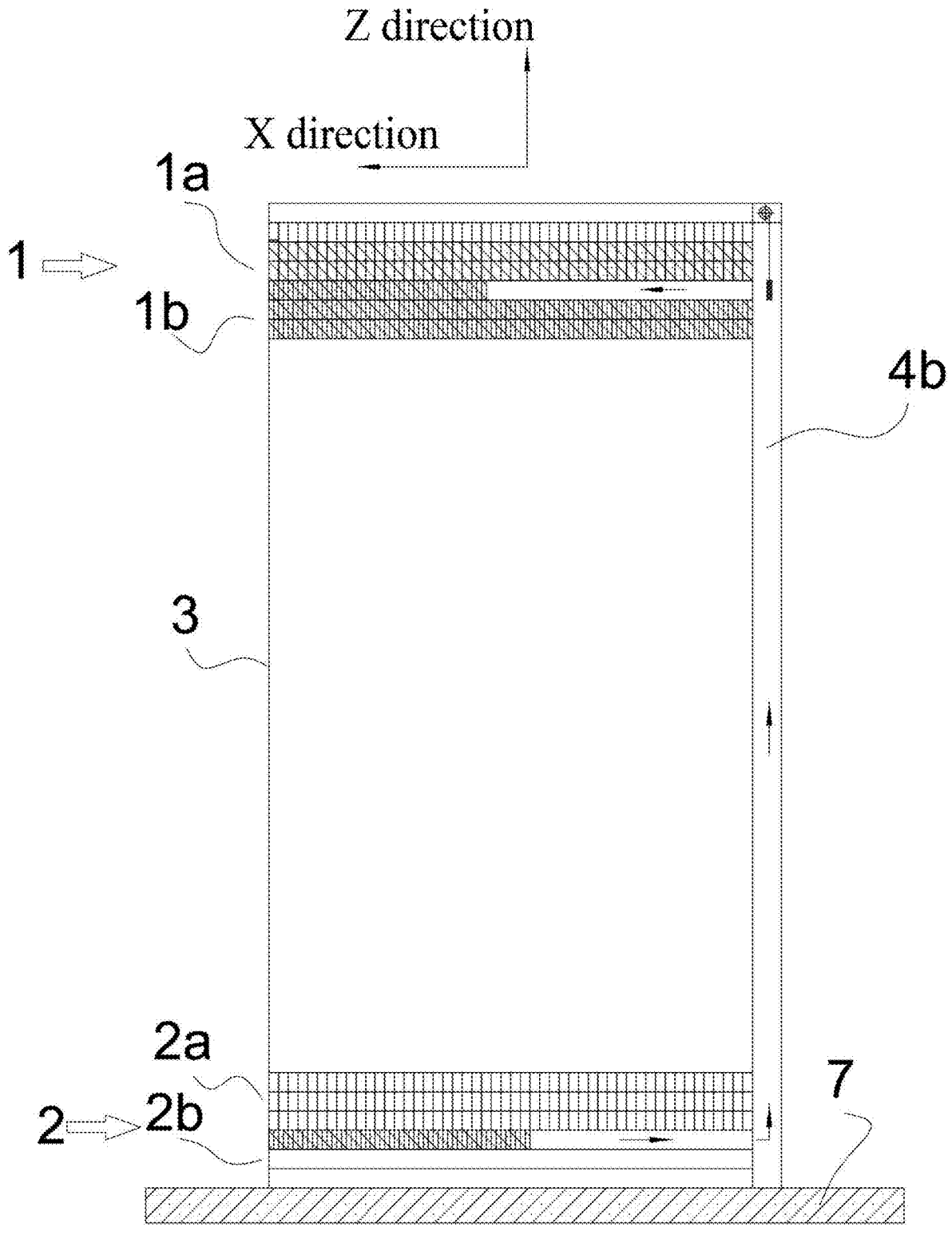
FIG. 4 is a sectional diagram of a parallel frame type gravity energy storage and transportation system according to a specific embodiment of the present disclosure in an X-Z direction (an arrow in the figure represents a stored energy transportation direction of a gravity block)
Figure 5:
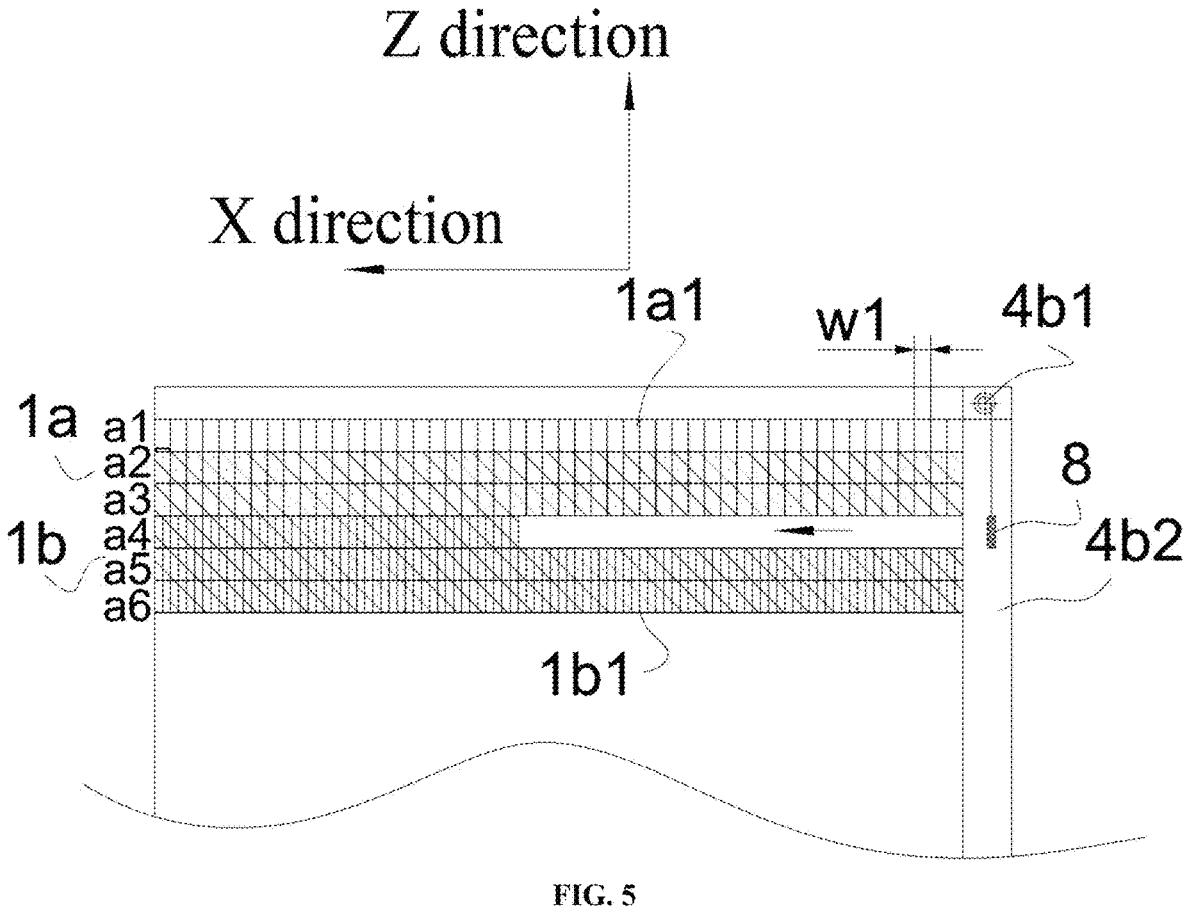
FIG. 5 is an enlarged view of a partial structure in FIG. 4.
Figure 6:
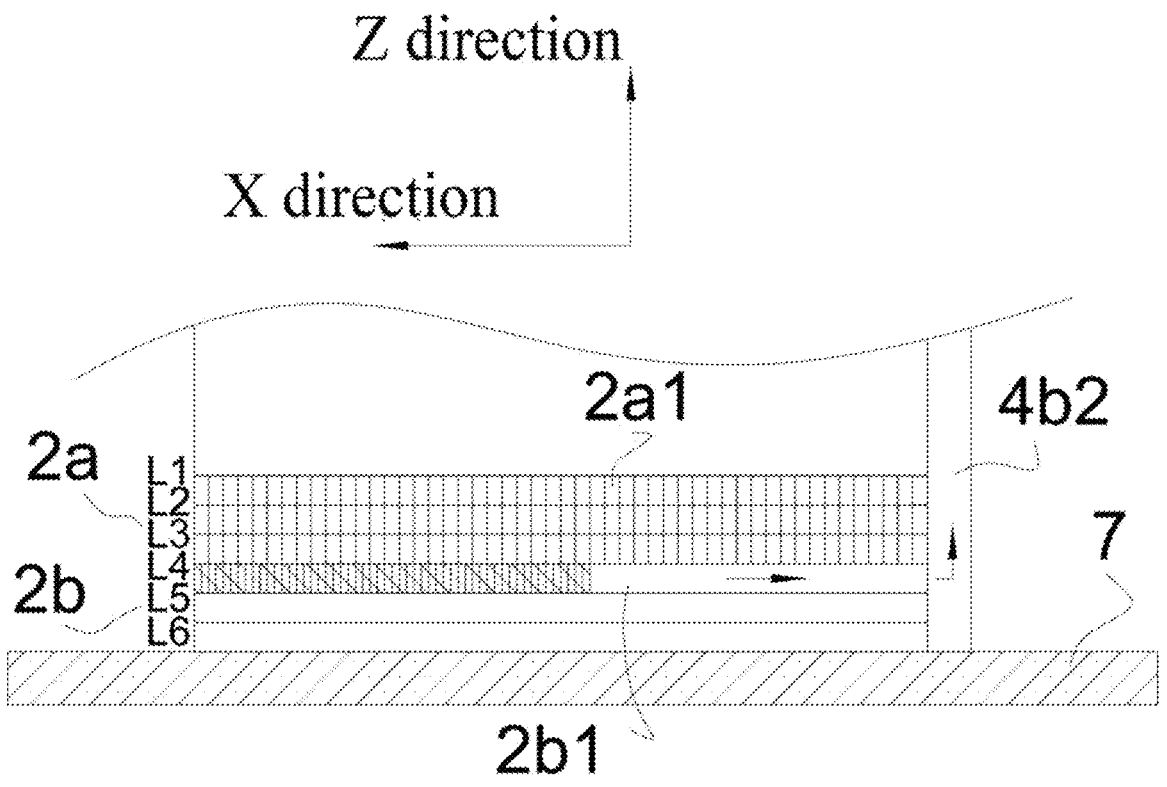
FIG. 6 is an enlarged view of another partial structure in FIG. 4.

As shown in FIG. 1 and FIG. 4, a parallel frame type
gravity energy storage and transportation system includes a
gravity energy storage parallel frame fixedly installed on a
foundation 7. Preferably, the gravity energy storage parallel
frame may specifically employ a stable and reliable structure
formed by connecting metal profiles and fasteners. During
actual manufacturing, an assembly production process can
be employed for the gravity energy storage parallel frame,
and the installation efficiency is high. Preferably, in this
embodiment, the operation of the gravity energy storage
parallel frame is supported by the foundation, The founda-
tion is specifically formed by pouring concrete in a steel
frame, which makes the whole life of the gravity energy
storage parallel frame reach more than 40 years and the life
cycle cost low.

In this embodiment, the gravity energy storage parallel
frame includes an energy storage layer area 1 and a storage
layer area 2 vertically distributed in a Z direction. The
energy storage layer area 1 includes multiple Y-direction
energy storage layers 1a distributed in a stacked manner in
the Z direction, and multiple X-direction energy storage
layers 1b distributed in a stacked manner in the Z direction.
The Y-direction energy storage layers and the X-direction
energy storage layers 1b are stacked and distributed in the Z
direction in a mutual perpendicular manner. Preferably, in
this embodiment, each Y-direction energy storage layer 1a is
composed of multiple Y-direction energy storage layer chan-
nels 1a1 arranged in turn in an X direction, and each
X-direction energy storage layer 1b is composed of multiple
X-direction energy storage layer channels 1b1 arranged in
turn in a Y direction.

In this embodiment, the storage layer area 2 includes
multiple Y-direction storage layers 2a distributed in a
stacked manner in the Z direction, and multiple X-direction
storage layers 2b distributed in a stacked manner in the Z
direction. The Y-direction energy storage layers 1a and the
Y-direction storage layers 2a correspond to each other in the Z direction, respectively, and the X-direction energy storage
layers 1b and the X-direction storage layers 2b correspond
to each other in the Z direction, respectively. Preferably, in
this embodiment, each Y-direction storage layer 2a is com-
posed of multiple Y-direction storage layer channels 2a1
arranged in turn in the X direction, and each X-direction
storage layer 2b is composed of multiple X-direction storage
layer channels 2b1 arranged in turn in the Y direction. The
Y-direction storage layer channels 2a1 and the Y-direction
energy storage layer channels 1a1 are in one-to-one corre-
spondence in the Z direction, and the X-direction storage
layer channels 2b1 and the X-direction energy storage layer
channels 2a1 are in one-to-one correspondence in the Z
direction.

Specifically, in this embodiment, further referring to FIG.
2, FIG. 3, FIG. 5 and FIG. 6, the energy storage layer area
1 includes three Y-direction energy storage layers 1a
(marked as a1, a2 and a3, respectively) which have the same
structure and are distributed in a stacked manner in the Z
direction, and each Y-direction energy storage layer 1a is
composed of multiple Y-direction energy storage layer chan-
nels 1a1 (rectangular) which have the same structure and are
arranged in turn in the X direction. The energy storage layer
area 1 further includes three X-direction energy storage
layers 1b (marked as a4, a5 and a6, respectively), which
have the same structure and are distributed in a stacked
manner in the Z direction, and each X-direction energy
storage layer 1b is composed of multiple X-direction energy
storage layer channels 1b1 (rectangular) which have the
same structure and are arranged in turn in the Y direction.
The Y-direction energy storage layers 1a and the X-direction
energy storage layers 1b are vertically stacked and distrib-
uted in the Z direction in a mutual perpendicular manner. It
should be particularly noted that during implementation,
those skilled in the art can select the number of the Y-di-
rection energy storage layer channels 1a1 in the Y-direction
energy storage layer 1a and the number of the X-direction
energy storage layer channels 1b1 in the X-direction energy
storage layer 1b according to actual needs, which is not
particularly limited in this embodiment.

In this embodiment, the storage layer area 2 includes three
Y-direction storage layers 2a (marked as L1, L2 and L3,
respectively) which have the same structure and are distrib-
uted in a stacked manner in the Z direction, and each
Y-direction storage layer 2a is composed of multiple Y-di-
rection storage layer channels 2a1 (rectangular) which have
the same structure and are arranged in turn in the X
direction. The storage layer area 2 further includes three
X-direction storage layers 2b (marked as L4, L5 and L6,
respectively) which have the same structure and are distrib-
uted in a stacked manner in the Z direction, and each
X-direction storage layer 2b is composed of multiple X-di-
rection storage layer channels 2b1 (rectangular) which have
the same structure and are arranged in turn in the Y direction.

Preferably, in other embodiments, in order to further
achieve energy storage capacity expansion, in the energy
storage layer area 1, the Y-direction energy storage layer 1a
and the X-direction energy storage layer 1b are distributed
in a manner of stacking single layers in a staggered manner.
In the storage layer area 2, the Y-direction storage layer 2a
and the X-direction storage layer 2b are distributed in a
manner of stacking single layers in a staggered manner. That
is, a single Y-direction energy storage layer 1a and a single
X-direction energy storage layer 1b are alternately stacked
and distributed in the Z direction in a mutual perpendicular
manner. Correspondingly, a single Y-direction storage layer 2a and a single X-direction storage layer 2b are alternately stacked and distributed in the Z direction in a mutual perpendicular manner.

Preferably, an intermediate layer area 3 is arranged between the energy storage layer area 1 and the storage layer area 2, and the intermediate layer area 3 is used as an expansion area of the energy storage layer area 1 and the storage layer area 2 in the Z direction. During actual operation, the intermediate layer area 3 may be used as a Z-direction expansion unit of the energy storage layer area 1 and the storage layer area 2 to increase the gravity energy storage capacity. Preferably, in this embodiment, the gravity blocks 8 used in the energy storage layer area 1 and the storage layer area 2 have the same shape and weight, and are mainly made of sandstone and carbon steel.

Figure 7:
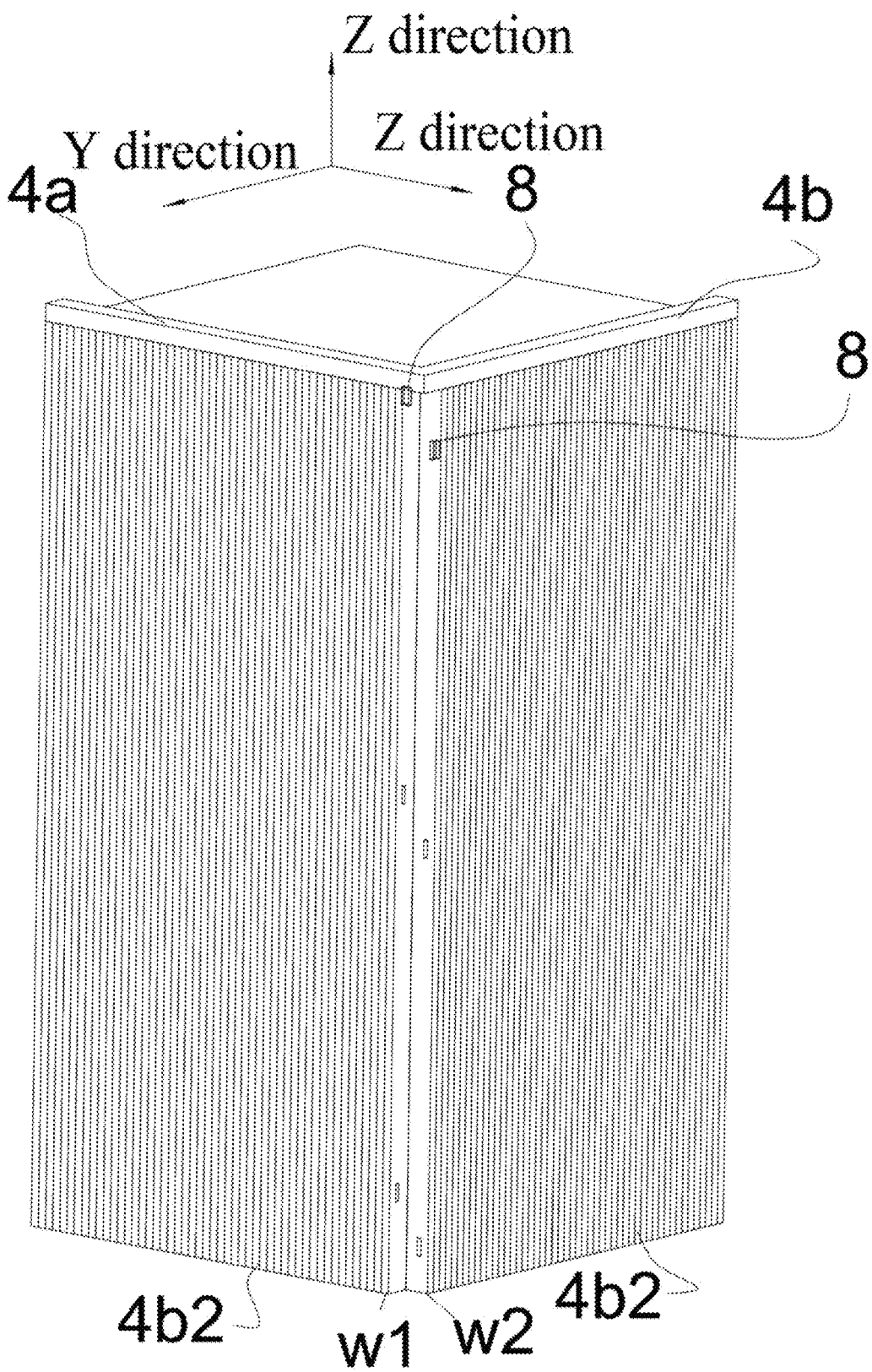
FIG. 7 is a schematic diagram of an axonometric structure of a parallel frame type gravity energy storage and transportation system according to a specific embodiment of the present disclosure (only a part of structure is shown)
Figure 8:
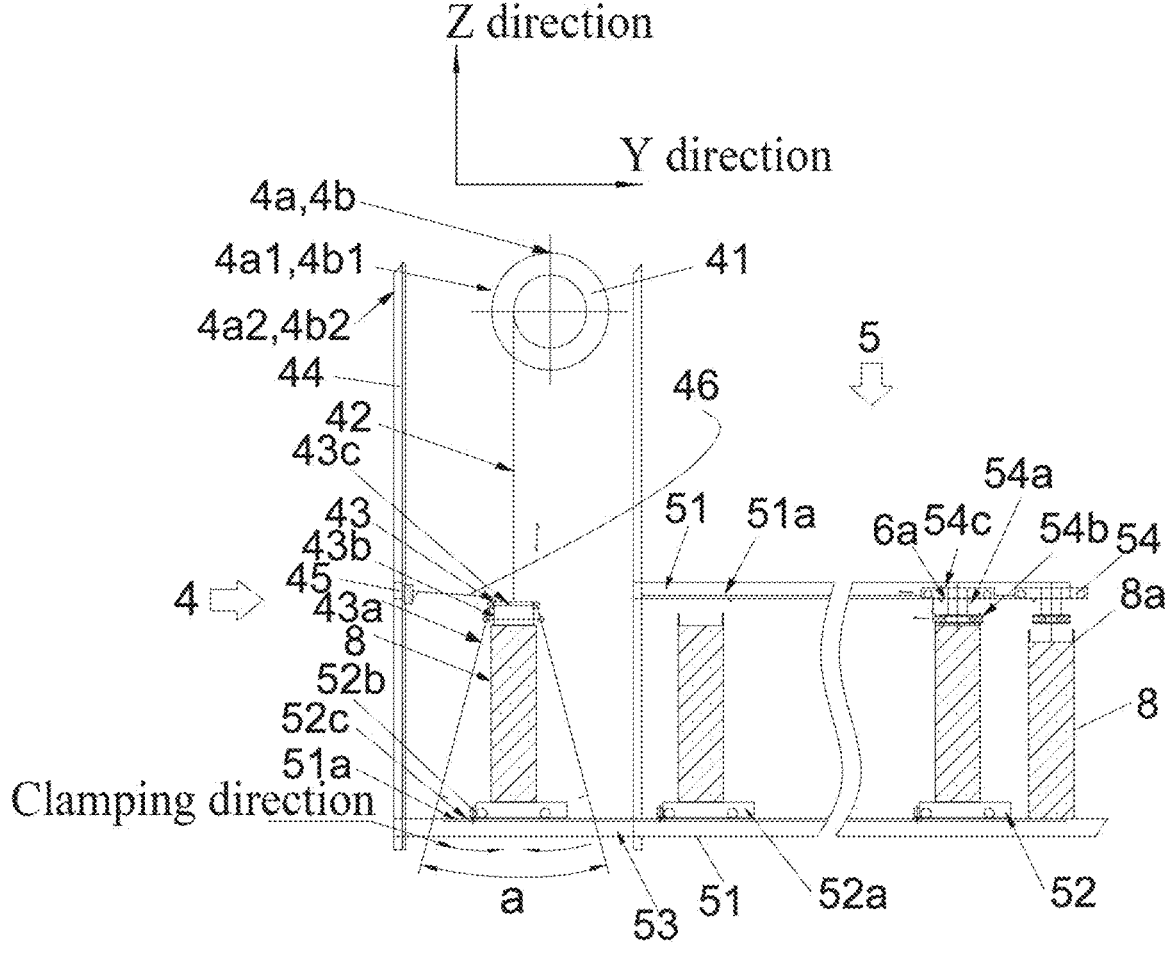
FIG. 8 is a schematic diagram of operation states of a transfer unit and a corresponding lifting unit thereof according to a specific embodiment of the present disclosure.
Figure 9:
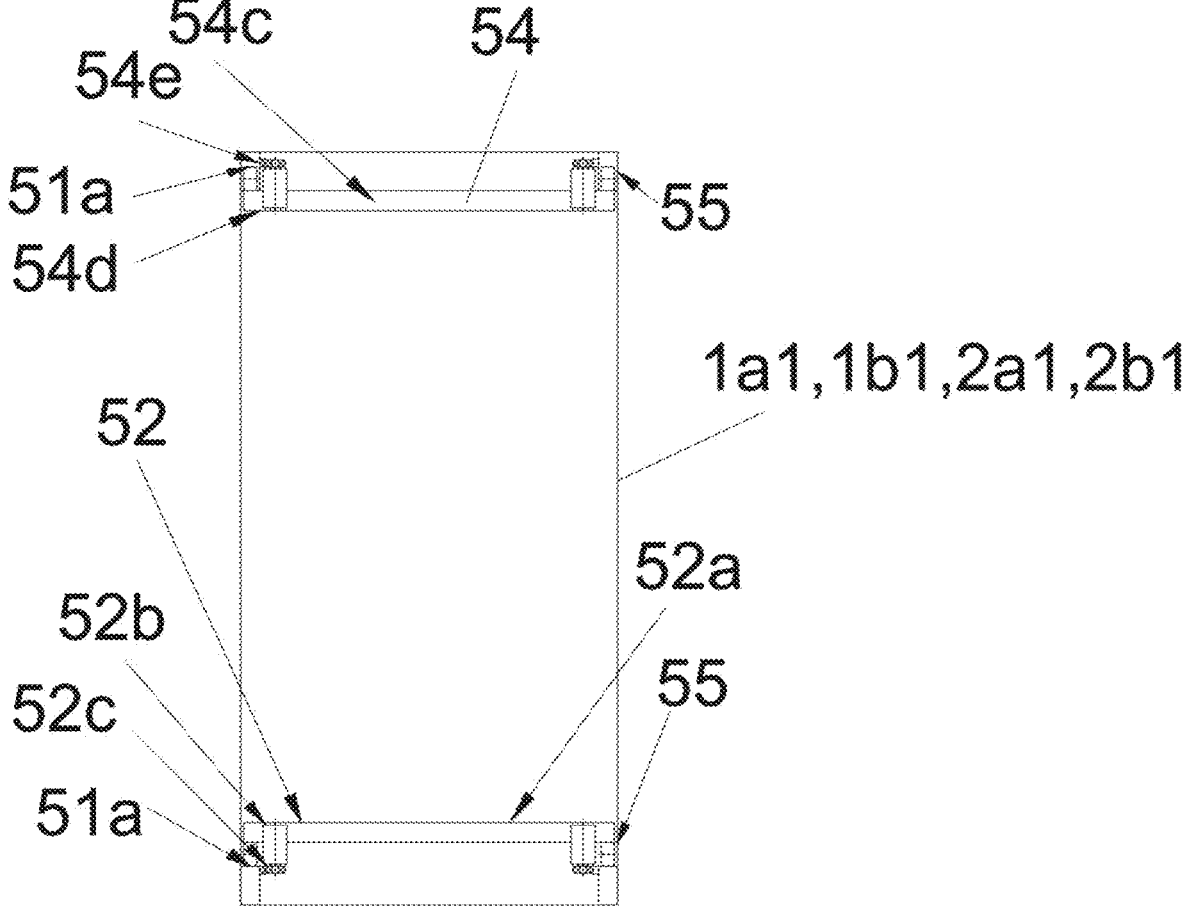
FIG. 9 is a schematic structural diagram of a transfer unit in FIG. 8.

In conjunction with FIG. 7, FIG. 8 and FIG. 9, in this embodiment, position switching of the gravity block 8 (placed in the Y direction) between the Y-direction energy storage layer 1a and the Y-direction storage layer 2a is achieved through a transfer unit 5 and a first lifting unit 4a, and position switching of the gravity block 8 (placed in the X direction) between the X-direction energy storage layer 1b and the X-direction storage layer 2b is achieved through the transfer unit 5 and a second lifting unit 4b.

Preferably, in this embodiment, the first lifting unit 4a includes multiple first lifting channels 4a2 arranged in turn in the X direction, and the first lifting channels 4a2 correspondingly communicate with the Y-direction energy storage layer channels 1a1 and the Y-direction storage layer channels 2a1 in the Z direction, respectively. The second lifting unit 4b includes multiple second lifting channels 4b2 arranged in turn in the Y direction, and the second lifting channels 4b2 correspondingly communicate with the X-direction energy storage layer channels 1b1 and the X-direction storage layer channels 2b1 in the Z direction, respectively. The first lifting channel 4a2 and the second lifting channel 4b2 are correspondingly and internally provided with a first lifting motor module 4a1 and a second lifting motor module 4b1, respectively. The first lifting motor module 4a1 and the second lifting motor module 4b1 are electrically connected to a control device (not shown in figure), respectively. Selective energy storage or power generation is achieved by changing the gravity block 8 by lifting and transferring. Specifically, preferably, in this embodiment, in order to facilitate channel transferring and capacity expansion effect, the number of the first lifting channels 4a2 is equal to the number of the X-direction energy storage layers 1b, and a width w1 of the first lifting channel 4a2 is equal to a width w3 of the Y-direction energy storage layer channel 1a1, and an overall vertical height of the first lifting channel 4a2 is equal to or greater than the sum of vertical stacking heights of the Y-direction energy storage layer 1a, the Y-direction storage layer 2a, the X-direction energy storage layer 1b, the X-direction storage layer 2b and the intermediate layer area 3. The number of the second lifting channels 4b2 is equal to that of the Y-direction storage layers 1a, a width w2 of the second lifting channel 4b2 is equal to a width w4 of the X-direction energy storage layer channel 1b1, an overall vertical height of the second lifting channel 4b2 is equal to or greater than the sum of vertical stacking heights of the Y-direction energy storage layer 1a, the Y-direction storage layer 2a, the X-direction energy storage layer 1b, the X-direction storage layer 2b and the intermediate layer area 3.

Preferably, in this embodiment, a guide rail 44, a slider 45 and a stiffness damping unit 46 are arranged in each of the first lifting channel 4a2 and the second lifting channel 4b2.

The guide rail 44 is connected to the corresponding slider 45 thereof to linear guidance in the Z direction. Each of the first lifting motor module 4a1 and the second lifting motor module 4a2 includes a lifting generator 41. A hoist rope 42 is installed on the lifting generator 41, and a tail end of the hoist rope 42 is provided with a manipulator 43 for selectively positioning and clamping the gravity block. Meanwhile, the manipulator 43 is connected to the slider 45 through the stiffness damping unit 46, and used to restrain the degree of rotational and translational freedom of the manipulator 43 and the gravity block 8. The manipulator 43 includes a long arm 43a of the manipulator, which is selectively opened and installed on a support rod 43b, and a telescopic rod 43c is mounted between the support rod 43b and the hoist rope 42. Particularly preferably, in this embodiment, the manipulator 43 can achieve automatic positioning under the action of the guide rail 44, the slider 45 and the stiffness damping unit 46 when an opening angle a of the long arm 43a of the manipulator is equal to 30°. The automatic grasping of the gravity block 8 can be achieved by the telescopic rod 43c and the support rod 43b, thus achieving the positioning and clamping of the gravity block 8.

Preferably, in this embodiment, the transfer unit 5 and the corresponding first lifting unit 4a or second lifting unit 4b are connected to achieve the transferring of the gravity block 8. The transfer unit 5 includes track beams 51 correspondingly arranged in each Y-direction energy storage layer 1a, each X-direction energy storage layer 1b, each Y-direction storage layer 2a and each X-direction storage layer 2b (a lightweight plane frame structure may be specifically adopted), respectively. A transfer cart 52 for transferring the gravity block 8 is installed on the track beam 51 in a relative displacement manner. An end, close to the corresponding lifting unit, of the track beam 5 extends towards a direction of the lifting unit to form a track beam extension 53.

Preferably, in this embodiment, the transfer cart 52 includes a transfer cart body 52a for transferring the gravity block 8. A gear 52c driven by a transfer cart motor 52b is installed on the transfer cart body 52a, and the gear 52c is in corresponding fit with a rack 51a installed on the track beam 51, thus achieving displacement guidance of the transfer cart body 52a on the track beam 51. The transfer unit 5 further includes a transit cart 54 suspended on the track beam 51, the transit cart 54 is provided with a vertical telescopic column 54a, and a horizontal telescopic pin 54b is installed at an end of the vertical telescopic column 54a. The horizontal telescopic pin 54b and the gravity block 8 are in limited installation and in selective fit with each other. Further, preferably, in this embodiment, the transit cart 54 includes a suspension cart body 54c for transiting and transferring the gravity block, and a gear 54e driven by a suspension vehicle motor 54d is installed on the suspension cart body 54c, and the gear 54e is in corresponding fit with the rack 51a mounted on the track beam 51 to guide the transit displacement of the transit vehicle 54 on the track beam 51, thus achieving the transferring displacement guidance of the transit cart 54 on the track beam 1. Particularly preferably, in this embodiment, both the transfer cart body 52a and the suspension cart body 54c adopt circular steel wheels 55, which can reduce the resistance and increase the mechanical properties and service life.

During operation, the horizontal telescopic pin 54b of the transit cart 54 moves in the Y direction or the X direction to selectively fix or disengage the corresponding gravity block 8 (an upper end of the gravity block 8 is provided with a horizontal limit portion 8a), and meanwhile, the vertical telescopic column 54a moves to cooperate with the horizontal telescopic pin 54*b* and the gravity block 8 to achieve positioning, fixing, disengaging or hoisting (the limit control effect is achieved through a travel switch 6*a*), thus achieving short-distance transferring of the gravity block 8 by the transit cart 54. The transit cart 4 is in cooperation with the transfer cart 52 to complete the transfer effect of the gravity block 8 in its energy storage layer channel or storage layer channel.

In the embodiment of the present disclosure, a meshing transmission mode of the gear driven by the motor and the rack is adopted to reduce the complexity of mechanical and electrical equipment of the transportation line, which has the advantages of simple transportation process, high transportation efficiency, reliable transportation, convenient maintenance, and easy capacity expansion. This embodiment can be used as the power generation capacity of a first-stage project, and can further achieve the expansion of a second-stage project, or the expansion of more stages of projects in the X direction or the Y direction.

In order to achieve accurate and reliable control effect, preferably, in this embodiment, the control device is installed above the foundation to facilitate operation monitoring and maintenance. The control device has the control coordination function of controlling the first lifting motor module 4*a*1, the second lifting motor module 4*b*1, the transfer cart 52, the transit cart 54 (including the travel switch 6*a*), and an external power hub, thus achieving high-capacity and high-operation energy storage or power generation effect.

It is apparent for those skilled in the art that the present disclosure is not limited to details of the above exemplary embodiments, and that the present disclosure may be implemented in other specific forms without departing from spirit or basic features of the present disclosure therefore, the embodiments should be regarded as exemplary and non-restrictive in all respect, and the scope of the present disclosure is defined by the appended claims rather than the above description. Therefore, all changes falling within the meaning and scope of equivalent elements of the claims should be included in the present disclosure. The reference numerals in the claims should not be considered as limiting the involved claims.

In addition, it should be understood that although this specification is described in terms of the embodiments, not every embodiment only includes an independent technical solution, and this description of the specification is only for the sake of clarity. Those skilled in the art should take the specification as a whole, and the technical solutions in various embodiments may also be appropriately combined to form other embodiments that can be understood by those skilled in the art.

What is claimed is:

1. A parallel frame type gravity energy storage and transportation system, comprising a gravity energy storage parallel frame fixedly installed on a foundation, wherein the gravity energy storage parallel frame comprises an energy storage layer area and a storage layer area which are vertically distributed in a Z direction;

the energy storage layer area comprises a plurality of Y-direction energy storage layers distributed in a stacked manner in the Z direction, and a plurality of X-direction energy storage layers distributed in a stacked manner in the Z direction; the Y-direction energy storage layers and the X-direction energy storage layers are stacked and distributed in the Z direction in a mutual perpendicular manner; the storage layer area comprises a plurality of Y-direction storage layers distributed in a stacked manner in the Z direction, and a plurality of X-direction storage layers distributed in a stacked manner in the Z direction;

the Y-direction energy storage layers and the Y-direction storage layers correspond to each other in the Z direction, and position switching of a gravity block between the Y-direction energy storage layer and the Y-direction storage layer is achieved through a transfer unit and a first lifting unit; and the X-direction energy storage layers and the X-direction storage layers correspond to each other in the Z direction, and position switching of the gravity block between the X-direction energy storage layer and the X-direction storage layer is achieved through the transfer unit and a second lifting unit.

2. The parallel frame type gravity energy storage and transportation system according to claim 1, wherein each Y-direction energy storage layer is composed of a plurality of Y-direction energy storage layer channels which are arranged in turn in an X direction, and each X-direction energy storage layer is composed of a plurality of X-direction energy storage layer channels which are arranged in turn in a Y direction;

each Y-direction storage layer is composed of a plurality of Y-direction storage layer channels which are arranged in turn in the X direction, and each X-direction storage layer is composed of a plurality of X-direction storage layer channels which are arranged in turn in the Y-direction; and the Y-direction storage layer channels and the Y-direction energy storage layer channels respectively correspond to each other in the Z direction, and the X-direction storage layer channels and the X-direction energy storage layer channels respectively correspond to each other in the Z direction.

3. The parallel frame type gravity energy storage and transportation system according to claim 2, wherein the first lifting unit comprises a plurality of first lifting channels arranged in turn in the X direction, and the first lifting channels correspondingly communicate with the Y-direction energy storage layer channels and the Y-direction storage layer channels in the Z direction, respectively; the second lifting unit comprises a plurality of second lifting channels arranged in turn in the Y direction, and the second lifting channels correspondingly communicate with the X-direction energy storage layer channels and the X-direction storage layer channels in the Z direction, respectively; the first lifting channel and the second lifting channel are correspondingly and internally provided with a first lifting motor module and a second lifting motor module, respectively; the first lifting motor module and the second lifting motor module are electrically connected to a control device, respectively, and selective energy storage or power generation is achieved by changing the gravity block by lifting and transferring; a guide rail, a slider and a stiffness damping unit are installed in each lifting channel, and the guide rail is connected to a corresponding slider thereof to achieve linear guidance in the Z direction.

4. The parallel frame type gravity energy storage and transportation system according to claim 3, wherein the first lifting motor module and the second lifting motor module each comprise a lifting generator, a hoist rope is installed on the lifting generator, and a tail end of the hoist rope is provided with a manipulator for selectively positioning and clamping the gravity block; the manipulator comprises a long arm of the manipulator, which is selectively opened and installed on a support rod, and a telescopic rod is installed between the support rod and the hoist rope; and the manipulator is connected to the slider through the stiffness damping unit, and is used to restrain the degree of rotational and translational freedom of the manipulator and the gravity block.

5. The parallel frame type gravity energy storage and transportation system according to claim 1, wherein in the energy storage layer area, the Y-direction energy storage layer and the X-direction energy storage layer are distributed in a manner of stacking single layers in a staggered manner; and in the storage layer area, the Y-direction storage layer and the X-direction storage layer are distributed in a manner of stacking single layers in a staggered manner.

6. The parallel frame type gravity energy storage and transportation system according to claim 1, wherein an intermediate layer area is arranged between the energy storage layer area and the storage layer area, and the intermediate layer area, as an expansion area of the energy storage layer area and the storage layer area in the Z direction, is used to increase gravity energy storage capacity.

7. The parallel frame type gravity energy storage and transportation system according to claim 1, wherein the transfer unit and the corresponding lifting unit are connected to achieve the transferring of the gravity block, the transfer unit comprises track beams correspondingly arranged in the Y-direction energy storage layer, the X-direction energy storage layer, the Y-direction storage layer and the X-direction storage layer, respectively, and a transfer cart for transferring the gravity block is installed on each track beam in a relative displacement manner.

8. The parallel frame type gravity energy storage and transportation system according to claim 7, wherein the transfer cart comprises a transfer cart body for transferring the gravity block, a gear driven by a transfer cart motor is installed on the transfer cart body, and the gear is in corresponding fit with a rack installed on the track beam, thus achieving displacement guidance of the transfer cart body on the track beam.

9. The parallel frame type gravity energy storage and transportation system according to claim 7, wherein the transfer unit further comprises a transit cart suspended on the track beam; the transit cart is provided with a vertical telescopic column, and a horizontal telescopic pin is installed at an end of the vertical telescopic column; and the horizontal telescopic pin and the gravity block are in limited installation and in selective fit with each other.

10. The parallel frame type gravity energy storage and transportation system according to claim 9, wherein the transit cart comprises a suspension cart body for transiting and transferring the gravity block, the gear driven by a suspension cart motor is installed on the suspension cart body, and the gear is in corresponding fit with a rack installed on the track beam, thus achieving the transferring displacement guidance of the transit cart on the track beam.

\* \* \* \* \*